United States Patent
Tame

(10) Patent No.: US 6,192,565 B1
(45) Date of Patent: Feb. 27, 2001

(54) AUTOMOTIVE SEAT ASSEMBLY HAVING A RECTRACTABLE HEADREST

(75) Inventor: Omar D. Tame, West Bloomfield, MI (US)

(73) Assignee: Magna Interior Systems Inc., Aurora (CA)

( * ) Notice: Subject to any disclaimer, the term of this patent is extended or adjusted under 35 U.S.C. 154(b) by 0 days.

(21) Appl. No.: 09/249,238

(22) Filed: Feb. 11, 1999

Related U.S. Application Data

(60) Provisional application No. 60/074,851, filed on Feb. 12, 1998.

(51) Int. Cl.$^7$ ............................. A47C 1/036; B60N 7/48
(52) U.S. Cl. ................................ 29/61; 297/410
(58) Field of Search .................. 297/61, 410, 378.12

(56) References Cited

U.S. PATENT DOCUMENTS

| | | | |
|---|---|---|---|
| 3,316,013 | * 4/1967 | Abel et al. | ............................. 397/61 |
| 4,350,389 | 9/1982 | Parsson et al. . | |
| 4,657,297 | 4/1987 | Ishibashi . | |
| 4,700,989 | 10/1987 | Ercilla . | |
| 4,762,367 | 8/1988 | Denton . | |
| 4,935,680 | 6/1990 | Sugiyama . | |
| 5,346,277 | 9/1994 | Holobaugh et al. . | |
| 5,605,377 | 2/1997 | Tame . | |
| 5,671,965 | 9/1997 | O'Connor . | |
| 5,681,079 | * 10/1997 | Robinson | ............................. 297/61 X |
| 5,738,411 | * 4/1998 | Sutton et al. | ............................. 297/378.12 |
| 5,918,940 | * 7/1999 | Wakamatsu et al. | ............................. 297/61 |

FOREIGN PATENT DOCUMENTS

| | | |
|---|---|---|
| 19727097 | 2/1998 | (DE) . |
| 29723240 | 7/1998 | (DE) . |
| 2432855 | 3/1980 | (FR) . |
| 2318285 | 4/1998 | (GB) . |

OTHER PUBLICATIONS

PCT Search Report 99/00084.

* cited by examiner

*Primary Examiner*—Anthony D. Barfield
(74) *Attorney, Agent, or Firm*—Howard & Howard

(57) ABSTRACT

An automotive seat including a seat cushion and a seat back. The seat back pivots relative to the seat cushion for movement between a seating position and a folded position. A headrest is mounted to the seat back and is moveable between a deployed position and a retracted position. The seat assembly is characterized by a control mechanism mounted between the seat back and the headrest for automatically moving the headrest between the deployed and retracted positions in response to the pivotal movement of the seat back between the seating and folded positions. The subject invention is also characterized by a cavity formed within the seat back for selectively housing the headrest. The control mechanism moves the headrest between the deployed position with the headrest disposed completely outside the cavity and the retracted position with the headrest disposed within the cavity.

20 Claims, 4 Drawing Sheets

AUTOMOTIVE SEAT ASSEMBLY HAVING A RECTRACTABLE HEADREST

RELATED APPLICATION

This patent application claims priority to and all the benefits of U.S. Provisional Patent Application Serial No. 60/074,851, filed on Feb. 12, 1998 and entitled "Retractable Head Rest".

TECHNICAL FIELD

The subject invention relates to automotive seat assemblies which include adjustable or retractable headrests.

BACKGROUND OF THE INVENTION

Front and rear seats in many passenger vehicles, such as automobiles, include respective headrests which provide added comfort for a passenger. In addition to the comfort feature, the headrests also provide a safety feature. Namely, the headrests provide needed head support during rear end collisions which reduces the likelihood of whiplash type injuries. Headrests are typically mounted to a top portion of a seat back as either an integral part of the seat back or as a separate unit mounted to the seat back. The separable headrests usually include some type of height adjustment mechanism. One of the deficiencies which occurs when having a headrest includes obstructed views for the driver and/or passengers. Another deficiency occurs when the seat is folded downwardly to provide added storage space. Specifically, the headrest protruding from the top portion of the seat back extends the length of the seat back; therefore, the amount of available storage space is reduced.

The prior art has contemplated some solutions to these deficiencies. One relatively simple solution is to remove the headrest from the seat back when views are obstructed and/or the seat back is folded downwardly. This however creates another problem of what to do with the loose headrest. Another solution relates to having the headrest move to a position behind the seat back. An example of this type of headrest is disclosed in U.S. Pat. No. 4,935,680. Some difficulties encountered with these designs are that the height adjustment means may be exposed and the headrest is still occupying a portion of the needed cargo space.

Hence, there is a need for a headrest design which can provide adequate support for a passenger and yet be retracted to improve the viewing area and increase the available storage space.

SUMMARY OF INVENTION AND ADVANTAGES

An automotive seat assembly comprising a seat cushion and a seat back, having top and bottom portions, pivotally mounted to the seat cushion for movement between a seating position and a folded position. A headrest is mounted to the top portion of the seat back and moveable between a deployed position and a retracted position. The seat assembly is characterized by a control mechanism mounted between the seat back and the headrest for automatically moving the headrest between the deployed and retracted positions in response to the pivotal movement of the seat back between the seating and folded positions. The subject invention is also characterized by a cavity formed within the top portion of the seat back for selectively housing the headrest. The control mechanism moves the headrest between the deployed position with the headrest substantially disposed outside of the cavity and the retracted position with the headrest substantially disposed within the cavity.

Accordingly, the headrest of the subject invention can provide adequate support for a passenger and be retracted to improve the viewing area and increase the available storage space in a vehicle. The headrest may be retracted automatically in response to the movement of the seat back or may be retracted by a separate actuation device. Further, the headrest may be retracted into the cavity in the seat back or behind, beside, or in front of the seat back.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 4:
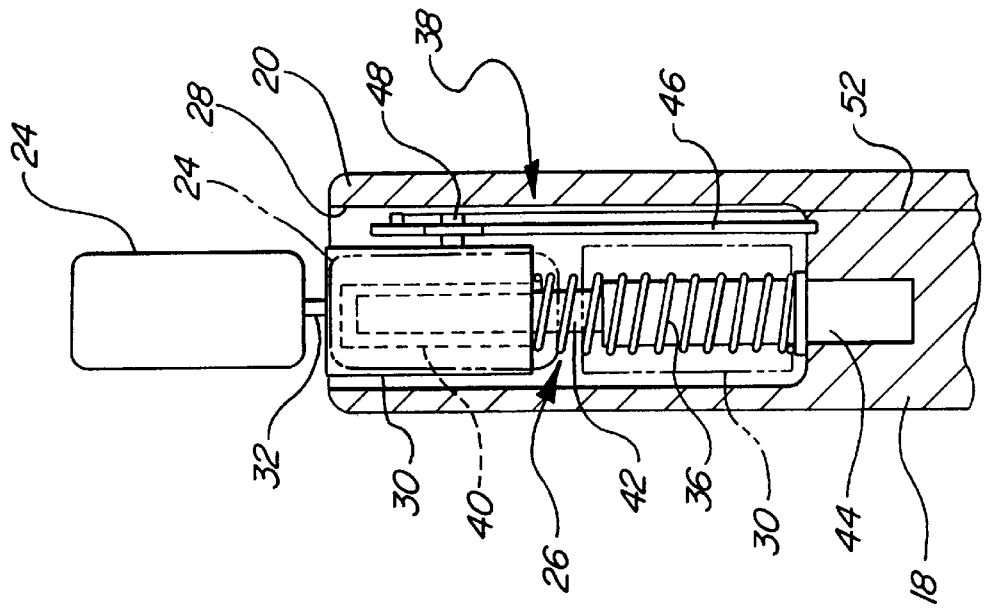
FIG. 4 is a partially cross-sectional side view of the seat back incorporating the headrest of the subject invention.
Figure 1:
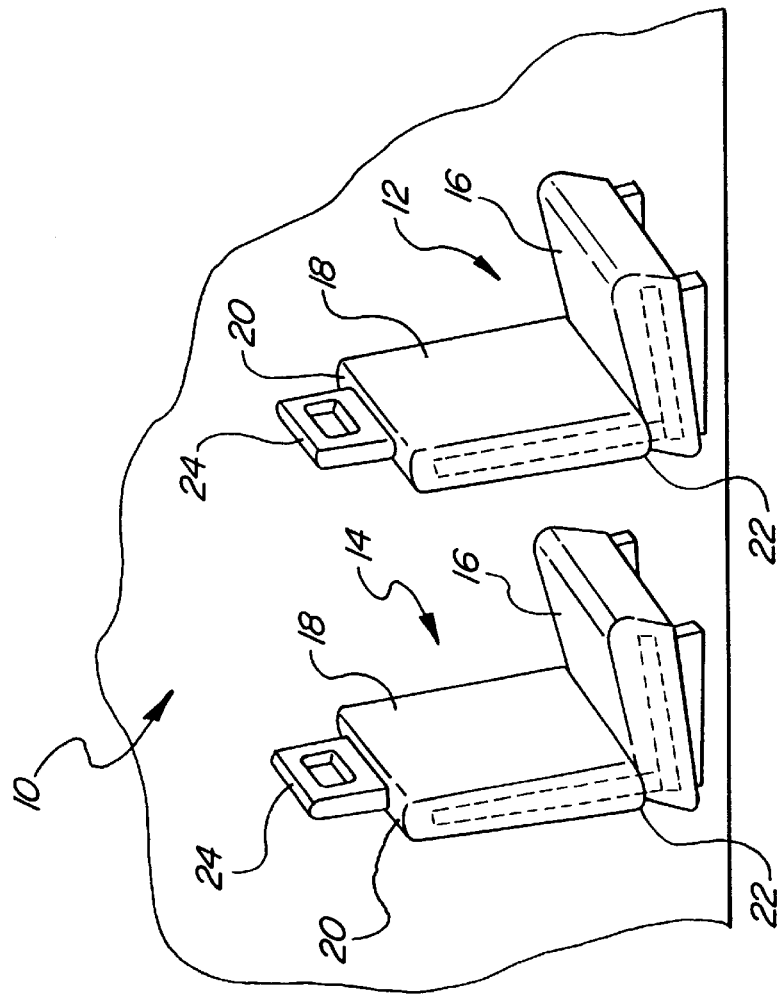
FIG. 1 is a perspective view of front and rear seat assemblies incorporating a headrest in accordance with the subject invention.
Figure 5:
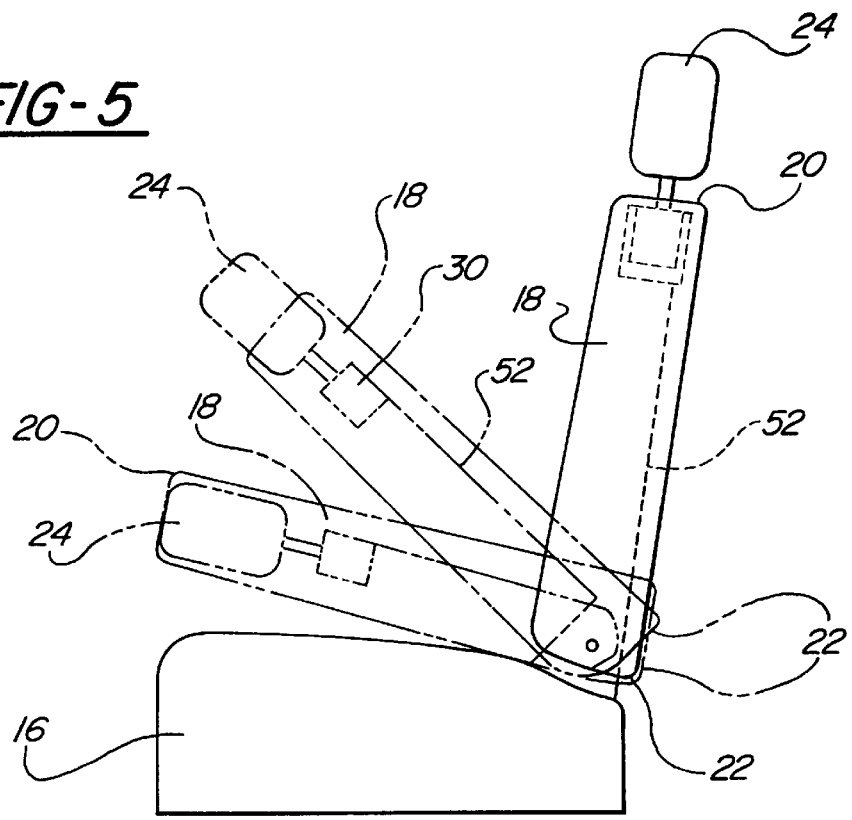
FIG. 5 is a schematic side view of the seat assembly with the seat back is a seating position, partially folded position, and a fully folded position.
Figure 6:
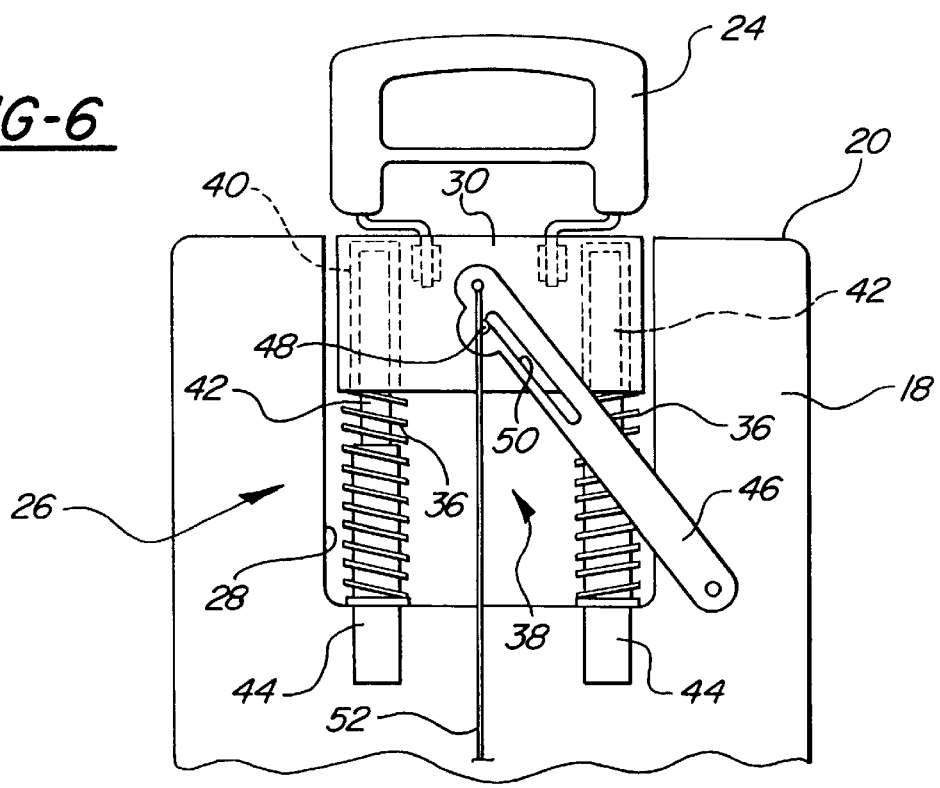
FIG. 6 is a partially cross-sectional rear view of the seat back with the headrest in the deployed position.

Referring to the Figures, wherein like numerals indicate like or corresponding parts throughout the several views, an automotive seat assembly is generally shown at 10 in FIG. 1. The seat assembly 10 comprises a front row seat 12 and a rear row seat 14. Both of the front 12 and rear 14 row seats include a seat cushion 16 and a seat back 18. Each of the seats 12, 14 are of a conventionally known construction which includes a seat frame, a flexible foam pad and a trim cover material. As also shown in FIG. 5, the seat back 18 has top 20 and bottom 22 portions and is pivotally mounted to the seat cushion 16 for movement between a seating position and a folded position. As appreciated by those skilled in the art, the seat back 18 is in a seating position when the seat back 18 is upright and substantially perpendicular to the seat cushion 16. The seat back 18 is in the folded position when the seat back 18 is pivoted forward toward the seat cushion 16 to at least partially overlay the seat cushion 16. In some applications the seat cushion 16 may pivot upwardly and forwardly along with the seat back 18 to create what is known in the art as a tumbled seat. In other applications, the seat cushion 16 may pivot upwardly and forwardly independently of the seat back 18 such that the seat back 18 may fold downward abutting an underside of the seat cushion 16.

Figure 2:
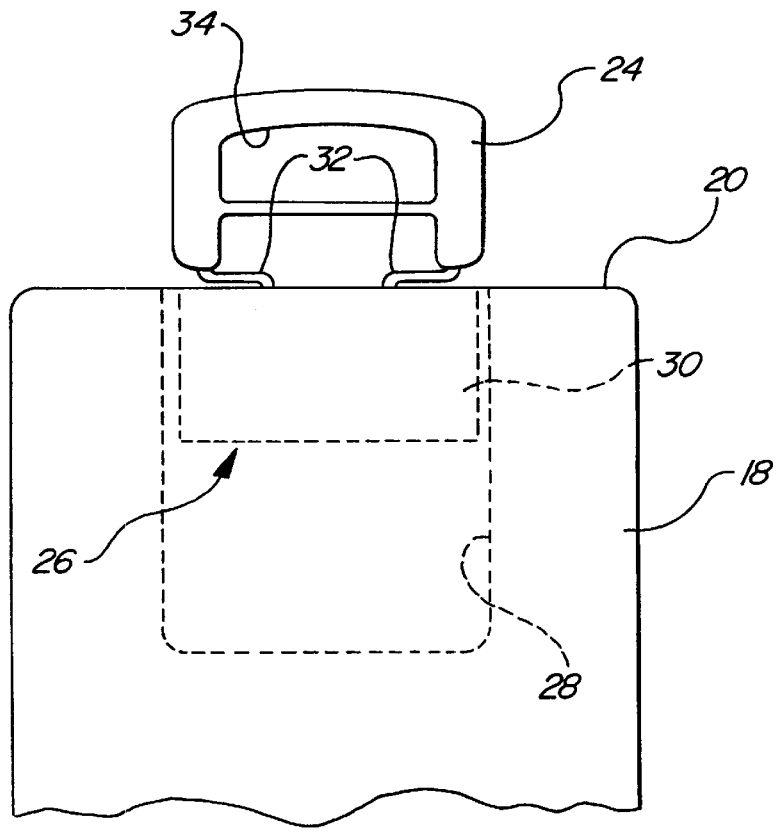
FIG. 2 is a schematic view of the headrest in a deployed position relative to a seat back.
Figure 3:
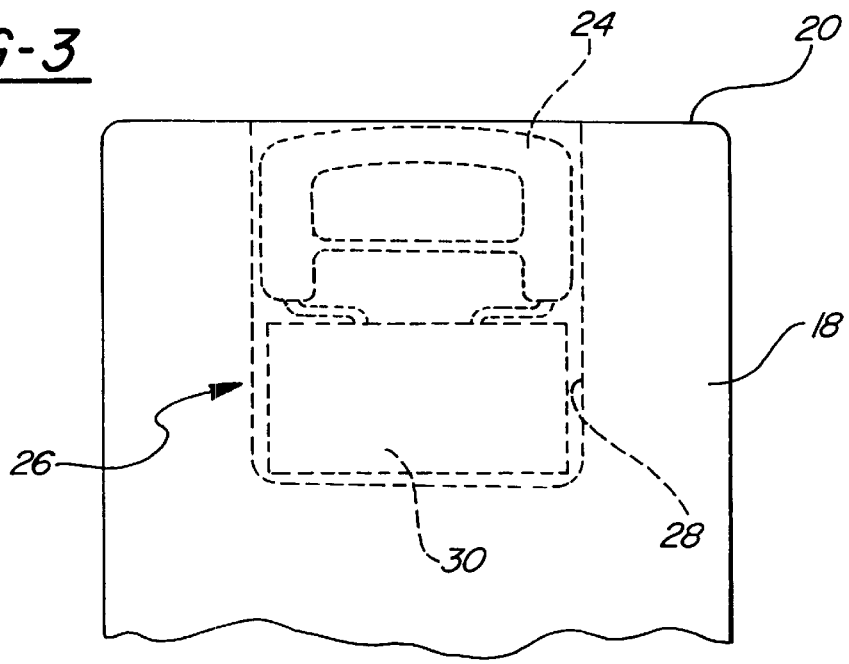
FIG. 3 is a schematic view of the headrest in a retracted position relative to the seat back.

Referring also to FIGS. 2 and 3, a headrest 24 is mounted to the top portion 20 of the seat back 18 and is moveable between a deployed position and a retracted position. A control mechanism, generally shown at 26, is mounted between the seat back 18 and the headrest 24 for moving the headrest 24 between the deployed and retracted positions.

Preferably, the seat assembly 10 includes a cavity 28 formed within the top portion 20 of the seat back 18 for selectively housing the headrest 24. The control mechanism 26 moves the headrest 24 between the deployed position with the headrest 24 substantially disposed outside of the cavity 28 and the retracted position with the headrest 24 substantially disposed within the cavity 28. Even more preferably, the headrest 24 is disposed completely outside of the cavity 28 when in the deployed position and disposed completely within the cavity 28 when in the retracted position. As appreciated, the headrest 24 may only be partially deployable and/or partially retractable without deviating from the overall scope of the subject invention. It is only necessary that some retraction take place in order to provide the desired retracting effect. As also appreciated, the control mechanism 26 may be of any suitable design or configuration without deviating from the general scope of the invention. As discussed below, the preferred design of retracting the headrest 24 is to link the headrest 24 with the pivotal movement of the seat back 18. The subject invention, however, is not limited to this particular linking design. The passenger may be able to retract the headrest 24 in any suitable manner irrespective of the position of the seat back 18.

Referring back to FIG. 5, the control mechanism 26 preferably moves the headrest 24 automatically between the deployed and retracted positions in response to the pivotal movement of the seat back 18 between the seating and folded positions. Hence, the movement of the headrest 24 is linked to the pivotal movement of the seat back 18. This provides a user friendly design in that a passenger only has to pivot the seat back 18 forward in order to retract the headrest 24. As appreciated, the cavity 28 formed within the seat back 18 may be eliminated such that the headrest 24 moves or retracts to a position overlying the front, side or rear of the seat back 18. The subject invention is not necessarily limited to automatically retracting the headrest 24, in response to movement of the seat back 18, into the cavity 28. As also appreciated, the deployment and/or retraction positions of the headrest 24 do not necessarily have to occur at the maximum seating and/or folding positions of the seat back 18.

Referring also to FIGS. 4 and 6 through 8, the control mechanism 26 further includes a moveable mounting plate 30 with the headrest 24 fixedly secured to the mounting plate 30. Specifically, the headrest 24 includes a pair of headrest posts 32 which are mounted to the plate 30. The headrest 24 shown is designed with a passageway 34 and may be covered by a trim cover material such as cloth, leather or vinyl. As appreciated, the headrest 24 may be of any suitable design or configuration. The control mechanism 26 also includes a biasing device 36 disposed within the cavity 28 between the mounting plate 30 and the seat back 18 for continuously biasing the headrest 24 between the retracted and deployed positions. The biasing device 36 may continuously bias the headrest 24 toward the retracted or deployed positions depending upon the particular configuration of the control mechanism 26. The control mechanism 26 also includes an actuation device, generally shown at 38, mounted between the seat back 18 and the mounting plate 30 for selectively moving the mounting plate 30 and the headrest 24 toward the retracted position and into the cavity 28. As discussed above, the actuation device 38 may be a separate manual or power device or may be interconnected with the movement of the seat back 18.

Figure 7:
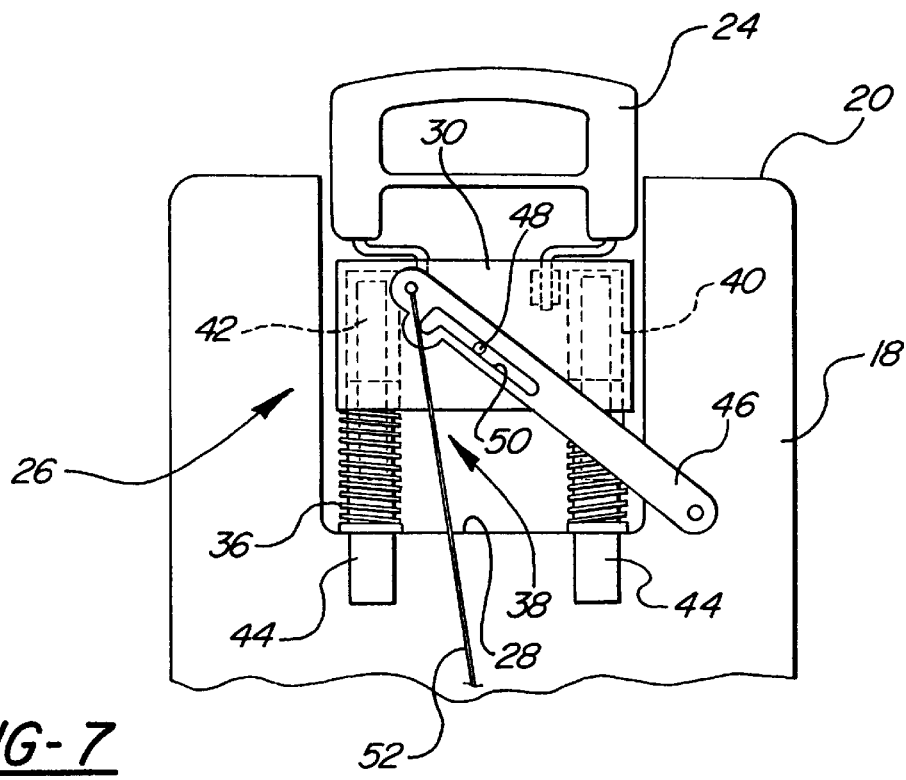
FIG. 7 is a partially cross-sectional rear view of the seat back with the headrest in a partially retracted position.
Figure 8:
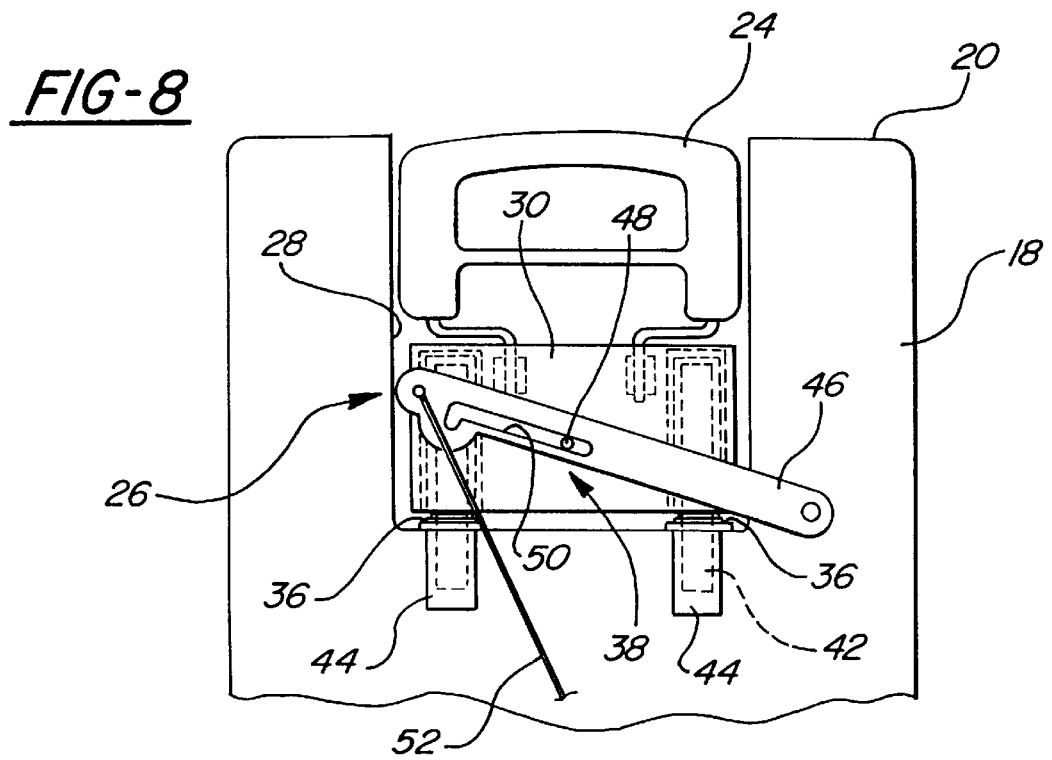
FIG. 8 is a partially cross-sectional rear view of the seat back with the headrest in the fully retracted position.

The preferred embodiment of the control mechanism 26 is now discussed in greater detail. At least one socket 40 is formed within the mounting plate 30 and at least one guide post 42 extends outwardly from the socket 40. The control mechanism 26 further includes at least one hollow support tube 44 mounted within the cavity 28 and extending upwardly toward the top portion 20 of the seat back 18. A collar (not numbered) securely mounts the support tube 44 to the frame of the seat back 18. Preferably, there are a pair of sockets 40, posts 42 and corresponding support tubes 44. The guide posts 42 are aligned with and slideably engage the support tubes 44 for supporting the headrest 24 and guiding the headrest 24 between the retracted and deployed positions relative to the cavity 28. Preferably, the guide posts 42 have a diameter smaller than an inner diameter of the sockets 40 such that the support tubes 44 may also extend into the sockets 40 when the headrest 24 is moved into the retracted position within the cavity 28 (FIGS. 7 and 8). The biasing device 36 is a coil spring 36 disposed around each of the support tubes 44 with a first end engaging the cavity 28 of the seat back 18 and a second end engaging the mounting plate 30 such that the mounting plate 30 and the headrest 24 are continuously biased toward the deployed position. The coil springs 36 encircle the tubes 44 in a helical manner as is known in the art. The biasing device 36 may be of any suitable design and may be positioned independent of the tubes 44.

The actuation device 38 further includes an actuation lever 46 pivotally mounted to the seat back 18. A limit pin 48 extends from the mounting plate 30 and slideably engages the lever 46 such that the lever 46 is movably mounted to the mounting plate 30. The lever 46 includes an integral L-shaped slot 50 with the limit pin 48 slideably disposed within the slot 50. The slot 50 is constructed to include an elongated portion and a recessed stop (not numbered). When the headrest 24 is in a deployed position, the limit pin 48 engages the recessed stop of the lever 46 which locks the headrest 24 in place. During the retracting and semi deployed movements of the headrest 24 the limit pin 48 slides within the elongated portion of the slot 50.

The actuation device 38 further includes a remote control cable 52 having a first end mounted to the lever 46 and a second end mounted to the bottom portion 22 of the seat back 18 such that pivotal movement of the seat back 18 toward the folded position tensions the cable 52 to move the lever 46 and the mounting plate 30 toward the retracted position against the biasing force of the biasing device 36. As discussed above, the second end of the cable 52 may be mounted to an alternative device, such as a handle (not shown), in order to provide a retracting feature for the headrest 24 without the pivoting of the seat back 18. The remote control cable 52 is of any suitable design such as a Bowden cable assembly having a surrounding conduit.

Preferably the cable 52 is mounted to the lever 46 at an opposite end from the pivot point and adjacent the recessed stop of the slot 50. The cable 52 may be fastened to the lever 46, seat back 18 and/or alternative device by any suitable cable fastener. As discussed above, the second end of the cable 52 is mounted to the bottom portion 22 of the seat back 18 and more preferably to a cable retracting mechanism (not shown) mounted to the bottom portion 22 of the seat back 18. The cable retracting mechanism retains the second end of the cable 52 in a fixed position. As the seat back 18 is pivoted forward toward the folded position the lever 46 moves downward due to the tensioning in the cable 52.

The preferred operation of the headrest 24 includes an automatic deployment and retraction based upon the position of the seat back 18 with the headrest 24 retracting into the cavity 28 formed within the seat back 18. When the headrest 24 is fully deployed (FIGS. 2, 4, 6) it is completely extended to the maximum limit allowed by the lever 46 and limit pin 48. As shown in FIG. 5, the headrest 24 is in a fully deployed position when the seat back 18 is in a fully upright seating position. As the seat back 18 is pivoted forwardly toward a folded position, the cable 52 tensions which pulls the lever 46 downwardly. The initial downward movement of the lever 46 disengages the limit pin 48 with the recessed stop of the slot 50. The limit pin 48 is subjected to a downwardly directed camming action by the elongated portion of the slot 50. The downward pulling force of the lever 46 overcomes the upward biasing force of the springs 36. This pulls the plate 30 downward which compresses the springs 36 and pulls the entire headrest 24 downward into the cavity 28. Specifically, the guide posts 42 telescopingly engage the tubes 44 as the headrest 24 moves into the cavity 28. The retracting action of the headrest 24 continues until the seat back 18 is completely folded. In this position (FIG. 8) the springs 36 are completely compressed and the headrest 24 is completely retracted into the cavity 28. As appreciated, the dimensions of the cavity 28, size of the springs 36, length of the cable 52, and total pivoting angle of the seat back 18 must all be appropriately coordinated to ensure a desired retraction of the headrest 24. As the seat back 18 is gradually pivoted rearward back to the seating position, the cable 52 gradually slackens which allows the springs 36 to automatically lift the headrest 24 out of the cavity 28. This upward deployment movement continues until the limit pin 48 returns into the recessed stop of the slot 50 thereby locking the headrest 24 in the deployed position.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An automotive seat assembly comprising;
   a seat cushion,
   a seat back, having top and bottom portions, said bottom portion being pivotally mounted to said seat cushion for movement between a seating position and a folded position,
   a mounting plate movably mounted to said top portion of said seat back,
   a headrest mounted to said mounting plate and moveable between a deployed position and a retracted position,
   said top portion of said seat back defining a cavity for selectively housing said headrest such that said headrest is substantially disposed outside of said cavity when said headrest is in said deployed position and said seat back is in said seating position, and said headrest is substantially disposed within said cavity when said headrest is in said retracted position and said seat back is in said folded position,
   a biasing device disposed between said mounting plate and said seat back for continuously biasing said headrest toward said deployed position,
   an actuation device mounted between said bottom portion of said seat back and said mounting plate, and
   said actuation device including an actuation lever pivotally mounted to said top portion of said seat back and coupled to said mounting plate for automatically moving said headrest toward said retracted position disposed within said cavity in response to said pivotal movement of said seat back toward said folded position.

2. An assembly as set forth in claim 1 further including at least one socket formed within said mounting plate and at least one guide post extending outwardly from said socket.

3. An assembly as set forth in claim 2 wherein said control mechanism further includes at least one hollow support tube mounted within said cavity and extending upwardly toward said top portion of said seat back.

4. An assembly as set forth in claim 3 wherein said guide post slideably engages said support tube for supporting said headrest and guiding said headrest between said retracted and deployed positions relative to said cavity.

5. An assembly as set forth in claim 4 wherein said guide post has a diameter smaller than an inner diameter of said socket such that said support tube may also extend into said socket when said headrest is moved into said retracted position within said cavity.

6. An assembly as set forth in claim 5 wherein said biasing device is a coil spring disposed around said support tube with a first end engaging said cavity of said seat back and a second end engaging said mounting plate such that said mounting plate and said headrest are continuously biased toward said deployed position.

7. An assembly as set forth in claim 1 further including a limit pin extending from said mounting plate and slideably engaging said lever such that said lever is movably mounted to said mounting plate.

8. An assembly as set forth in claim 7 wherein said lever includes an integral slot with said limit pin slideably disposed within said slot.

9. An assembly as set forth in claim 8 wherein said actuation device further includes a remote control cable having a first end mounted to said lever and a second end mounted to said bottom portion of said seat back such that said pivotal movement of said seat back toward said folded position tensions said cable to move said lever and said mounting plate toward said retracted position against said biasing force of said biasing device.

10. An automotive seat assembly comprising;
    a seat cushion,
    a seat back having top and bottom portions,
    a headrest mounted to said top portion of said seat back and moveable between a deployed position and a retracted position,
    a control mechanism mounted between said seat back and said headrest for moving said headrest between said deployed and retracted positions,
    said top portion of said seat back defining a cavity formed therein for selectively housing said headrest, said control mechanism moving said headrest between said deployed position with said headrest substantially disposed outside of said cavity and said retracted position with said headrest substantially disposed within said cavity, and
    said control mechanism including at least one support tube and a biasing device each mounted within said cavity between said headrest and said seat back, said support tube guiding said headrest between said deployed and retracted positions and said biasing device continuously biasing said headrest toward said deployed position.

11. An assembly as set forth in claim 10 wherein said control mechanism further includes a moveable mounting plate with said headrest fixedly secured to said mounting plate.

12. An assembly as set forth in claim 10 wherein said control mechanism further includes an actuation device mounted between said seat back and said mounting plate for selectively moving said mounting plate and said headrest toward said retracted position and into said cavity.

13. An assembly as set forth in claim 12 wherein said seat back is pivotally mounted to said seat cushion for movement between a seating position and a folded position wherein said control mechanism automatically moves said headrest between said deployed and retracted positions in response to said pivotal movement of said seat back between said seating and folded positions.

14. An assembly as set forth in claim 13 further including at least one socket formed within said mounting plate and at least one guide post extending outwardly from said socket.

15. An assembly as set forth in claim 14 wherein said guide post slideably engages said support tube for supporting said headrest and guiding said headrest between said retracted and deployed positions relative to said cavity.

16. An assembly as set forth in claim 15 wherein said biasing device is a coil spring disposed around said support tube with a first end engaging said cavity of said seat back and a second end engaging said mounting plate such that said mounting plate and said headrest are continuously biased toward said deployed position.

17. An assembly as set forth in claim 16 wherein said actuation device further includes an actuation lever pivotally mounted to said seat back.

18. An assembly as set forth in claim 17 further including a limit pin extending from said mounting plate and slideably engaging said lever such that said lever is movably mounted to said mounting plate.

19. An assembly as set forth in claim 18 wherein said lever includes an integral slot with said limit pin slideably disposed within said slot.

20. An assembly as set forth in claim 19 wherein said actuation device further includes a remote control cable having a first end mounted to said lever and a second end mounted to said bottom portion of said seat back such that said pivotal movement of said seat back toward said folded position tensions said cable to move said lever and said mounting plate toward said retracted position against said biasing force of said biasing device.

\* \* \* \* \*